UNITED STATES PATENT OFFICE

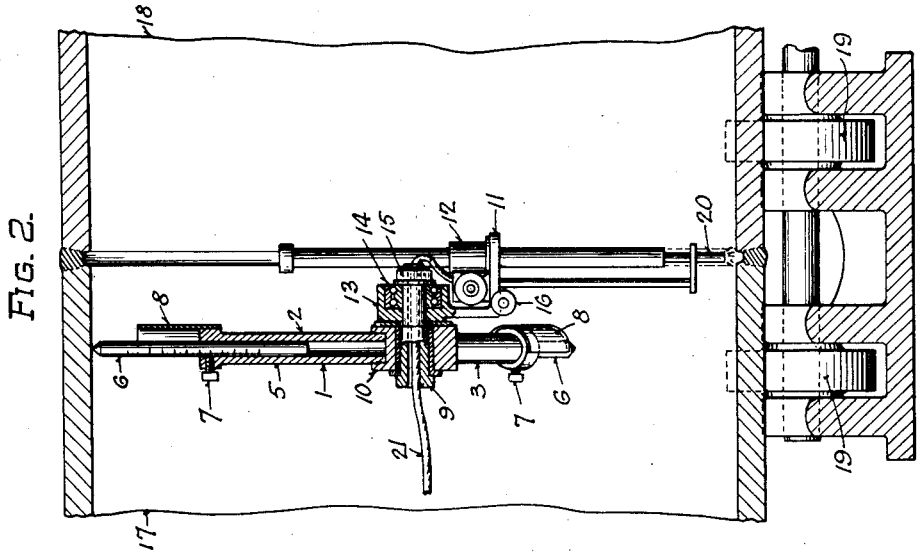
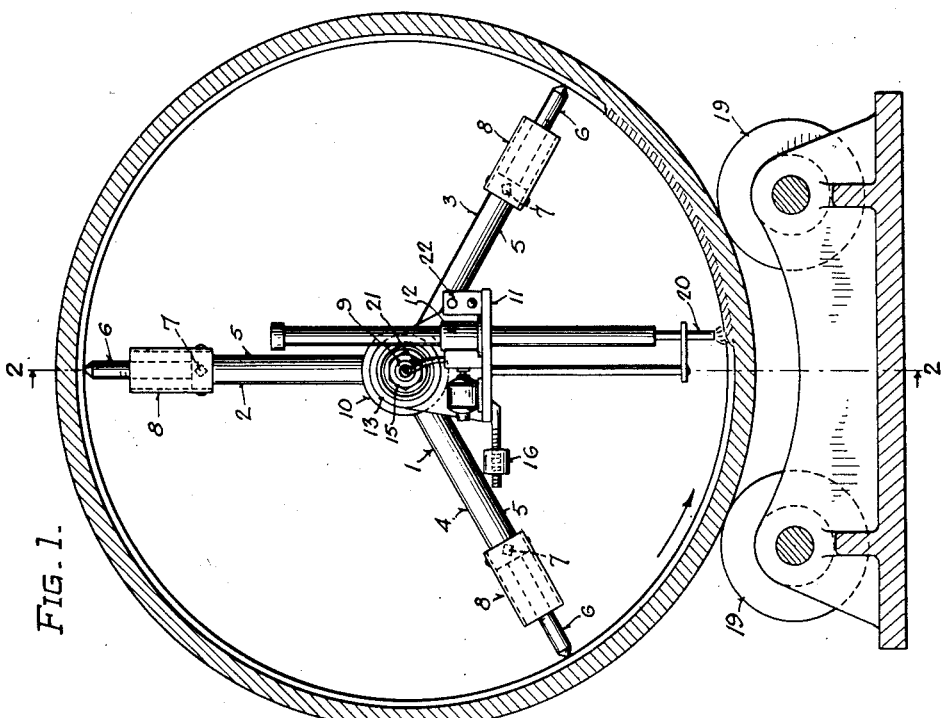
INVENTOR.
Howard J. Burnish
BY
ATTORNEY.

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

ELECTRIC ARC WELDING APPARATUS

Application filed December 16, 1929. Serial No. 414,386.

This invention relates to an electric arc welding apparatus and relates more particularly to an apparatus for arc welding circumferential seams of thick walled pressure vessels.

An object of the invention is to provide an apparatus for arc welding circumferential seams upon the inside of thick walled pressure vessels.

A more specific object of the invention is to provide a portable mounting for a welding head for use in welding circumferential seams upon the inside of thick walled pressure vessels.

An embodiment of the invention is illustrated in the accompanying drawings in which:

Figure 1 is a view of a transverse section through a pressure vessel showing the apparatus in position for welding.

Fig. 2 is a view of a longitudinal section taken on the line 2—2 of Fig. 1.

The welding apparatus support includes a tripod 1 having legs 2, 3 and 4. Each leg comprises a sleeve 5, and a rod 6 which is movable therein. The rods are preferably calibrated for certain vessel diameters to aid in centering the apparatus. A set screw 7 is provided to lock each rod 6 at the desired position. The tips of the rods 6 are preferably hardened and pointed to prevent slipping during the welding operation. A spatter guard 8 is provided to prevent drops of molten metal from the arc from accumulating on the rod 6 and inhibiting the movement of the rod into the sleeve 5.

A hollow stub axle 9 is rigidly mounted in the hub 10 of the tripod 1. A bracket 11 supports the welding head 12 and is suspended from a hub 13 which has a bearing 14 on the axle 9. The hub is held in place by a nut 15 on the end of the stub axle 9. An adjustable counter-balance 16 is mounted upon the bracket 11 to regulate the angle, relative to perpendicular, at which the welding head is suspended.

The portions 17 and 18 of the vessel to be welded are mounted upon drive rollers 19 which cause the vessel to rotate at welding speed. The tripod 1 rotates with the vessel. The welding head 12 is suspended from the stub axle 9, and the weldrod 20 which is fed from the welding head 12 maintains a substantially perpendicular position when the tripod is rotated except as varied by the counter-balance 16. Current from a suitable source is supplied to the welding head 12 by means of a cable 21 which passes through the hollow stub axle 9 to the welding head. A switch 22 for starting and stopping the apparatus is conveniently mounted upon the bracket 11. The tripod 1 is placed so that the weldrod 20 is directly over the seam, and the counterbalance 16 is adjusted to direct the arc at the desired angle. The tripod legs or rods 6 are set to engage the inside wall of the vessel at equal distances from the seam to be welded.

In the operation of the apparatus the switch 22 is closed, and an arc is struck between the weldrod 20 and the work. The vessel begins to rotate upon the rollers 19, and the tripod 1 revolves with it. The stub axle 9 revolves inside the hub 13, and the welding head 12 remains substantially stationary as the seam passes progressively past the arc. By mounting the welding head at a central pivot point, the arc length is readily maintained with any suitable weldrod feeding mechanism.

The apparatus may have various modifications within the scope of the claims.

I claim:

1. In an apparatus for welding circumferential seams upon the inside of cylindrical vessels, a support, means for mounting the support inside the cylindrical vessel, and an electric welding head pivotally mounted upon the support and adapted to hang substantially stationary therefrom.

2. In an apparatus for welding circumferential seams upon the inside of cylindrical vessels, an adjustable support, a bracket pivotally carried by the support at the center of the vessel, and an electric welding head mounted upon the bracket.

3. In an apparatus for welding circumferential seams on the inside of cylindrical vessels, a support, a bracket pivoted to said support at the center of the vessel, a welding apparatus carried by said bracket, and means to rotate the vessel upon a horizontal axis whereby the welding apparatus is caused to progressively heat and weld the circumferential seam of the vessel.

4. In an apparatus for welding circumferential seams on the inside of cylindrical vessels, a tripod support, a bracket pivoted to said support at the center of the vessel, a welding apparatus carried by said bracket, and means to rotate the vessel upon its horizontal axis whereby the welding apparatus is caused to progressively heat and weld the circumferential seam of the vessel.

5. In an apparatus for welding circumferential seams upon the inside of cylindrical vessels, a tripod having extensible legs radiating from a hub for mounting said tripod in a plane parallel to that of the seam to be welded, and a welding head pivotally carried upon the hub of the tripod and freely hanging therefrom.

6. In an apparatus for welding circumferential seams upon the inside of cylindrical vessels, a support, means for locating the support centrally in the cylindrical vessel, means for rotating the support and the cylindrical vessel, and a counterweighted welding head pivotally attached to the support and freely hanging therefrom.

7. In an apparatus for welding circumferential seams upon the inside of cylindrical vessels, an adjustable support, a bracket pivotally carried by the support at the center of the vessel and hanging therefrom, a welding head mounted upon the bracket, and an adjustable counterweight attached to the bracket for regulating the angular position thereof.

8. In an apparatus for welding circumferential seams upon the inside of cylindrical vessels, a bearing, three equidistant radiating legs fastened to said bearing in a plane perpendicular to the axis of the bearing, graduated extensions adjustably attached to each of said legs for supporting the bearing with its axis substantially in line with the axis of the cylindrical vessel, a welding head pivotally mounted in said bearing for welding a circumferential seam upon the interior of the vessel, and a counterweight adjustably connected to said welding head for varying the distance from the lowest point on the seam at which the welding head operates.

In witness whereof, I have hereunto signed my name at Milwaukee, Wisconsin, this 13th day of December, 1929.

HOWARD J. BURNISH.